(12) United States Patent
Schultz et al.

(10) Patent No.: US 8,640,452 B2
(45) Date of Patent: Feb. 4, 2014

(54) HYDRAULIC CIRCUIT FOR A POWER TRANSMISSION DEVICE

(75) Inventors: John C. Schultz, Saline, MI (US);
Norman Schoenek, Novi, MI (US);
Kevin Michael Dougan, Plymouth, MI (US); Edwin T. Grochowski, Howell, MI (US); Daryl A Wilton, Macomb, MI (US); Edward W. Mellet, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 867 days.

(21) Appl. No.: 12/689,295

(22) Filed: Jan. 19, 2010

(65) Prior Publication Data

US 2011/0176932 A1 Jul. 21, 2011

(51) Int. Cl.
*F04B 49/00* (2006.01)

(52) U.S. Cl.
USPC .......................................................... 60/486

(58) Field of Classification Search
USPC ................. 60/435, 456, 486; 417/16
See application file for complete search history.

(56) References Cited

U.S. PATENT DOCUMENTS

| 3,675,112 | A | * | 7/1972 | Smith ............................. 60/435 |
| 4,498,847 | A | * | 2/1985 | Akiyama ........................ 60/486 |
| 5,148,676 | A | * | 9/1992 | Moriya et al. ................. 60/486 |
| 5,615,553 | A | * | 4/1997 | Lourigan ........................ 60/486 |
| 6,361,287 | B1 | * | 3/2002 | Hopper ......................... 417/286 |
| 6,563,229 | B2 | * | 5/2003 | Farkas ........................ 290/30 A |
| 7,204,472 | B2 | | 4/2007 | Jones et al. |
| 7,565,801 | B2 | * | 7/2009 | Tozawa et al. .................. 60/486 |
| 2009/0175742 | A1 | * | 7/2009 | Grethel et al. ............. 417/410.1 |
| 2009/0241535 | A1 | | 10/2009 | Schultz et al. |
| 2011/0173965 | A1 | * | 7/2011 | Holmes et al. .................. 60/456 |

FOREIGN PATENT DOCUMENTS

CN 101230920 A 7/2008

* cited by examiner

*Primary Examiner* — Thomas E Lazo (57) ABSTRACT

A hydraulic fluid circuit for a power transmission device includes a first hydraulic circuit segment fluidly decoupled from a second hydraulic circuit segment. A hydraulic pump includes a first fluidic pumping element and a second fluidic pumping element. The first fluidic pumping element fluidly communicates with the first hydraulic circuit segment. The second fluidic pumping element fluidly communicates with the second hydraulic circuit segment. The first fluidic pumping element is controllable to a first pump operating point to achieve a preferred high fluidic flow rate in the first hydraulic circuit segment. The second fluidic pumping element is controllable to a second pump operating point to achieve a preferred high fluidic pressure in the second hydraulic circuit segment.

14 Claims, 4 Drawing Sheets

HYDRAULIC CIRCUIT FOR A POWER TRANSMISSION DEVICE

TECHNICAL FIELD

This disclosure relates to hydraulic pumps and hydraulic systems for a transmission in a vehicle powertrain.

BACKGROUND

The statements in this section merely provide background information related to the present disclosure and may not constitute prior art.

Known hydraulic systems for vehicular transmissions include hydraulic pumps and fluidic circuits that provide pressurized fluidic flow to effect gear lubrication, transmission and motor cooling, and clutch activation. A hydraulic pump can be directly driven by an internal combustion engine with a rotational speed proportional to engine speed. Preferably, the hydraulic pump is configured to provide sufficient hydraulic pressure to the fluidic circuit to meet peak flow and pressure demands, such as hydraulic fluid demand during shifting of the transmission, hot engine idle speed garage shifts, and, in certain transmissions, a hydraulic park mode in an electronic transmission range selector system. Additionally, hydraulic pressure and flow requirements of the transmission may still exist when the engine (and thus the engine-driven pump) is off, such as to provide pressurized hydraulic fluid for clutch activation during operation in an electric-only operating mode in a hybrid electro-mechanical powertrain.

As engine speed increases, pump speed of an engine-driven hydraulic pump increases, thereby increasing hydraulic flow rate and increasing torque load used to drive the pump. This consumes engine power, negatively affecting fuel economy. Limiting the hydraulic flow rate decreases the torque load of the engine used for the engine-driven hydraulic pump. On-demand pumps including binary pumps are configured for full or a partial volumetric output. Operating such pumps at partial volumetric output decreases the torque load of the engine used by the pump thereby improving fuel efficiency. Fluidic flow and associated hydraulic line pressure are affected by pump speed and the temperature of the hydraulic fluid. Hydraulic pressure and flowrate through a fluidic circuit are interdependent. It is appreciated that fluid flow rate through a hydraulic circuit is proportional to the pressure difference through the flow path.

Physical packaging limitations place constraints on transmission designs, including location and size of a hydraulic pump. For example, an engine-driven, i.e., an on-axis hydraulic pump has a rotational axis that is aligned with an axis of rotation of an input member of the transmission. Therefore, an on-axis pump affects packaging, including extending an overall length of a transmission. An off-axis pump has an axis of rotation offset from and eccentric to the transmission axis, e.g., an electrically powered auxiliary hydraulic pump. Off-axis pumps offer increased flexibility in packaging location.

A hybrid powertrain can include a hydraulic system to provide pressurized hydraulic fluid for a number of functions throughout the powertrain. These functions include low pressure high volumetric fluidic flow for cooling for electric motors, and high pressure, low volumetric fluidic flow for clutch activation to effect torque transfer between input and output members associated with the engine, electrical machines, and driveline. Various control schemes and operational connections between the aforementioned components of the hybrid drive system are known, and the control system must be able to engage and disengage the various components from the transmission in order to perform the functions of the hybrid powertrain system. Hydraulic control systems can be used to lubricate mechanical devices such as bearings and planetary gear sets.

Pumps provide pressurize hydraulic fluid within a hydraulic control system for a transmission. In addition to a mechanically-driven hydraulic pump coupled to an engine output member, a hydraulic control system for a transmission may include an electrically-driven auxiliary pump to supplant the mechanically-driven hydraulic pump. Known hybrid powertrain systems operate with the engine in engine-on and engine-off operating states. When operating a hybrid powertrain system in the engine-off state, the mechanically driven hydraulic pump cannot provide a supply of pressurized hydraulic flow to the hydraulic control system. Instead, the electrically-driven auxiliary pump provides hydraulic line pressure required to operate the powertrain system.

The main on-axis hydraulic pump supplies hydraulic line pressure necessary for sufficient hydraulic flow for the transmission and all components of the hybrid drive system at engine idle speeds. Therefore, at operating speeds greater than engine idle the main on-axis hydraulic pump produces excess hydraulic line pressure thereby producing an excess hydraulic flow.

SUMMARY

A hydraulic fluid circuit for a torque transmission device includes a first hydraulic circuit segment fluidly decoupled from a second hydraulic circuit segment and a hydraulic pump including a first fluidic pumping element and a second fluidic pumping element. The first fluidic pumping element is configured to fluidly communicate with the first hydraulic circuit segment and the second fluidic pumping element is configured to fluidly communicate with the second hydraulic circuit segment. A first power source and a second power source are selectively rotatably coupled to the first and second fluidic pumping elements. The first fluidic pumping element is controllable to a first pump operating point to achieve a preferred high fluidic flow rate in the first hydraulic circuit segment, and the second fluidic pumping element is controllable to a second pump operating point to achieve a preferred high fluidic pressure at a low fluidic flow rate in the second hydraulic circuit segment.

BRIEF DESCRIPTION OF THE DRAWINGS

One or more embodiments will now be described, by way of example, with reference to the accompanying drawings, in which.

DETAILED DESCRIPTION

Referring now to the drawings, wherein the showings are for the purpose of illustrating certain exemplary embodiments only and not for the purpose of limiting the same, a hydraulic control system 10 includes a hydraulic pump 16 fluidly coupled to provide pressurized hydraulic fluid to a hydraulic circuit for a device including a first hydraulic circuit segment 10A and a second hydraulic circuit segment 10B. The hydraulic pump 16 selectively receives pumping torque from a mechanical power source, e.g., an internal combustion engine 20 and from an electric motor 18 in a manner described with reference to specific embodiments. Like numerals refer to like elements in the various embodiments.

Figure 1:
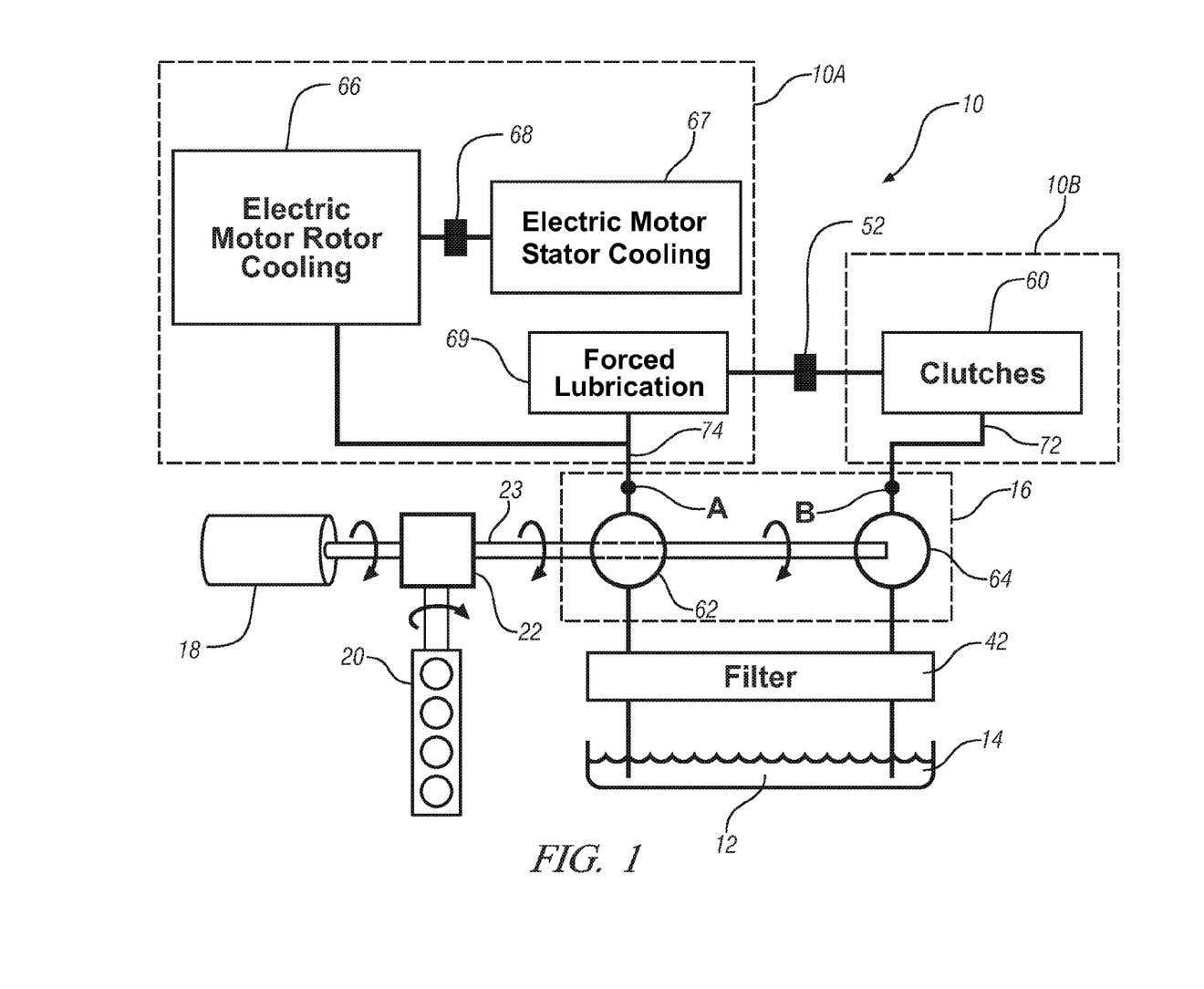
FIG. 1 schematically illustrates a hydraulic control system including a hydraulic pump element fluidly coupled to provide pressurized hydraulic fluid to a hydraulic circuit for a device including a first hydraulic circuit segment and a second hydraulic circuit segment in accordance with the present disclosure.

FIG. 1 schematically illustrates a first embodiment of the hydraulic control system 10 in accordance with the present disclosure. The hydraulic control system 10 is configured for use in a powertrain system including a torque transmission device of a powertrain system including an internal combustion engine 20 and an electro-mechanical hybrid transmission. The engine 20 can include any known engine configuration including a multi-cylinder internal combustion engine selectively operative in one of a plurality of operating states to transfer torque to the transmission. Exemplary engine operating states during ongoing powertrain operation can include an engine-on state, an engine fuel cutoff state, a cylinder deactivation state, and an engine-off state.

The hydraulic pump 16 includes first and second positive displacement hydraulic pump elements 62 and 64. The first and second positive displacement hydraulic pump elements 62 and 64 each preferably includes a positive displacement pump element. The positive displacement pump elements may be, for example, a fixed displacement binary gear pump, a binary balanced vane pump, or another positive displacement pump element. The first positive displacement hydraulic pump element 62 is fluidly connected to and configured to pump hydraulic fluid at a low pressure, high volumetric flowrate to the first hydraulic circuit segment 10A at pump outlet 74. The second positive displacement hydraulic pump element 64 is configured to pump hydraulic fluid at a high pressure, low volumetric flowrate to the second hydraulic circuit segment 10B at pump outlet 72.

The first and second positive displacement hydraulic pump elements 62 and 64 are preferably coaxially driven by a dual input torque source that includes an output shaft 23 from the internal combustion engine 20 and the controllable electric motor 18. A controllable one-way clutch 22 controls torque transfer from one of the internal combustion engine 20 and controllable electric motor 18 to both the first and second positive displacement hydraulic pump elements 62 and 64 via the output shaft 23. This includes a first clutch actuation mode wherein the controllable one-way clutch 22 is controlled to effect torque transfer from the engine 20 to the first and second positive displacement hydraulic pump elements 62 and 64, i.e., the first and second positive displacement hydraulic pump elements 62 and 64 are mechanically-driven. In second clutch actuation mode the controllable one-way clutch 22 effects torque transfer from the electric motor 18 to the first and second positive displacement hydraulic pump elements 62 and 64, i.e., the first and second positive displacement hydraulic pump elements 62 and 64 are electrically-driven. Using this configuration, the engine 20 can be selectively employed to drive the first and second positive displacement hydraulic pump elements 62 and 64 under specific operating conditions, e.g., light and moderate load conditions. Using this configuration, the electric motor 18 can be selectively employed to drive the first and second positive displacement hydraulic pump elements 62 and 64 under specific operating conditions, e.g., engine-off conditions and high-speed/high-load operating conditions. This configuration allows the first positive displacement hydraulic pump element 62 to be controlled to a first pump operating point to achieve a preferred high fluidic flow rate in the first hydraulic circuit segment 10A and coincidently control the second positive displacement hydraulic pump element 64 to a second pump operating point to achieve a preferred high fluidic pressure at a low fluidic flow rate in the second hydraulic circuit segment 10B. In an alternate embodiment, the controllable one-way clutch 22 controls torque transferred from one of a rotating shaft of the transmission and the controllable electric motor 18 to both the first and second positive displacement hydraulic pump elements 62 and 64 via the output shaft 23. In an alternate embodiment, a rotating shaft output from the transmission rotatably connects to the first positive displacement hydraulic pump element 62 and the controllable electric motor 18 rotatably connects to the second positive displacement hydraulic pump element 64. In an alternate embodiment, a first controllable electric motor 18 rotatably connects to the first positive displacement hydraulic pump element 62 and a second controllable electric motor 18 rotatably connects to the second positive displacement hydraulic pump element 64.

The hydraulic pump 16 draws hydraulic fluid 12 from a sump 14. The sump 14 is a tank or reservoir preferably disposed at the bottom of the transmission. The hydraulic fluid 12 returns to the sump 14 from various components and regions of the transmission by way of unpressurized fluid return lines. The hydraulic fluid 12 is drawn from the sump 14 through a filter 42 and is communicated throughout the hydraulic control system 10 via the hydraulic pump 16 that includes first and second positive displacement hydraulic pump elements 62 and 64.

The first hydraulic circuit segment 10A and the second hydraulic circuit segment 10B are configured to control clutch activation, provide lubrication to various mechanical gear elements, and provide fluid for cooling elements of the transmission, including electric stators and electric rotors associated with electric torque motors. Preferably, the first hydraulic circuit segment 10A and the second hydraulic circuit segment 10B are fluidly decoupled.

The first hydraulic circuit segment 10A is fluidly connected to the first positive displacement hydraulic pump element 62 at outlet 74. The first positive displacement hydraulic pump element 62 is configured to supply a relatively low pressure, high volumetric flow stream of hydraulic fluid to the first hydraulic circuit segment 10A. In one embodiment, an exemplary low pressure, high volumetric flow stream is about 20 liters per minute (lpm) at 200 kPa. The first hydraulic circuit segment 10A is configured to supply hydraulic fluid for cooling and lubricating the transmission, and includes a lubrication circuit 69, an electric motor rotor cooling circuit 66, and an electric motor stator cooling circuit 67. Hydraulic fluid flow between the electric motor rotor cooling circuit 66 and the electric motor stator cooling circuit 67 is controlled by a first hydraulic flow valve 68. Preferably the first hydraulic circuit segment 10A includes a mechanism for monitoring the volumetric flow, preferably at or associated with flow at circuit point A. This can include temperature sensors for monitoring temperatures of one or both the electric motor rotor cooling circuit 66 and the electric motor stator cooling circuit 67. In determining flow of pressurized hydraulic fluid 12 to the first hydraulic circuit segment 10A, the primary concern is to provide sufficient volumetric flowrate to achieve cooling and lubricating functions associated with the lubrication circuit 69, the electric motor rotor cooling circuit 66, and the electric motor stator cooling circuit 67. System pressure is a secondary concern, i.e., there needs to be sufficient pressure in the system to achieve the preferred flowrate to effect cooling and lubrication.

The second hydraulic circuit segment 10B is fluidly connected to the second positive displacement hydraulic pump element 64 at outlet 72. The second positive displacement hydraulic pump element 64 is configured to supply a relatively high pressure, low volumetric flow stream of hydraulic fluid. In one embodiment, an exemplary high pressure, low volumetric flow stream is about 5 liters per minute (lpm) at 850 kPa. The second hydraulic circuit segment 10B is configured to supply pressurized hydraulic fluid to a clutch activation circuit (including clutches) 60 associated with the second hydraulic circuit segment 10B to selectively activate and deactivate one or more torque transfer clutches using known solenoid control valves for transmission gear selection and control. Preferably, the second hydraulic circuit segment 10B includes a pressure sensor correlatable to pressure at circuit point B that provides pressure feedback for controlling operation of the second positive displacement hydraulic pump element 64, including controlling torque generation by the electric motor 18. In one embodiment the pressure sensor is a pressure switch device. In determining flow of pressurized hydraulic fluid 12 to the first hydraulic circuit segment 10A, the primary concern is to provide sufficient hydraulic pressure to achieve activation and deactivation of clutches in the clutch activation circuit 60. Hydraulic flowrate is a secondary concern, i.e., there needs to be sufficient flow in the system to achieve the preferred pressure.

In one embodiment, the clutch activation circuit 60 includes a hydraulic circuit having at least two branches that feed a plurality of clutch actuators, each including a hydraulically actuated piston and housing assembly. Actuation of the piston in turn engages or disengages a clutch element for transmitting torque, synchronizing gears, and activating a brake device. Each branch of the clutch activation circuit 60 communicates pressurized hydraulic fluid to the shift actuators that can include on/off solenoids, three-port pressure control valves or solenoids, one or more valves, and pressure sensors. Hydraulic fluid 12 communicated to the clutch activation circuit 60 selectively exhausts back to the sump 14.

The first and second hydraulic circuit segments 10A and 10B are preferably fluidly decoupled, with limited or no pressurized fluidic connection therebetween. In one embodiment, a flow restrictor/pressure relief valve 52 can be used to permit a low level of fluidic flow from the second hydraulic circuit segment 10B to the first hydraulic circuit segment 10A, as a secondary circuit for cooling and pressure relief.

Input torque power of the electric motor 18 can be controlled to vary hydraulic pump speed and corresponding required hydraulic circuit pressure, using feedback from sensors associated with circuit points A and B, and hydraulic flow volumes from the hydraulic pump 16 in the first exemplary hydraulic control system 10.

Figure 2:
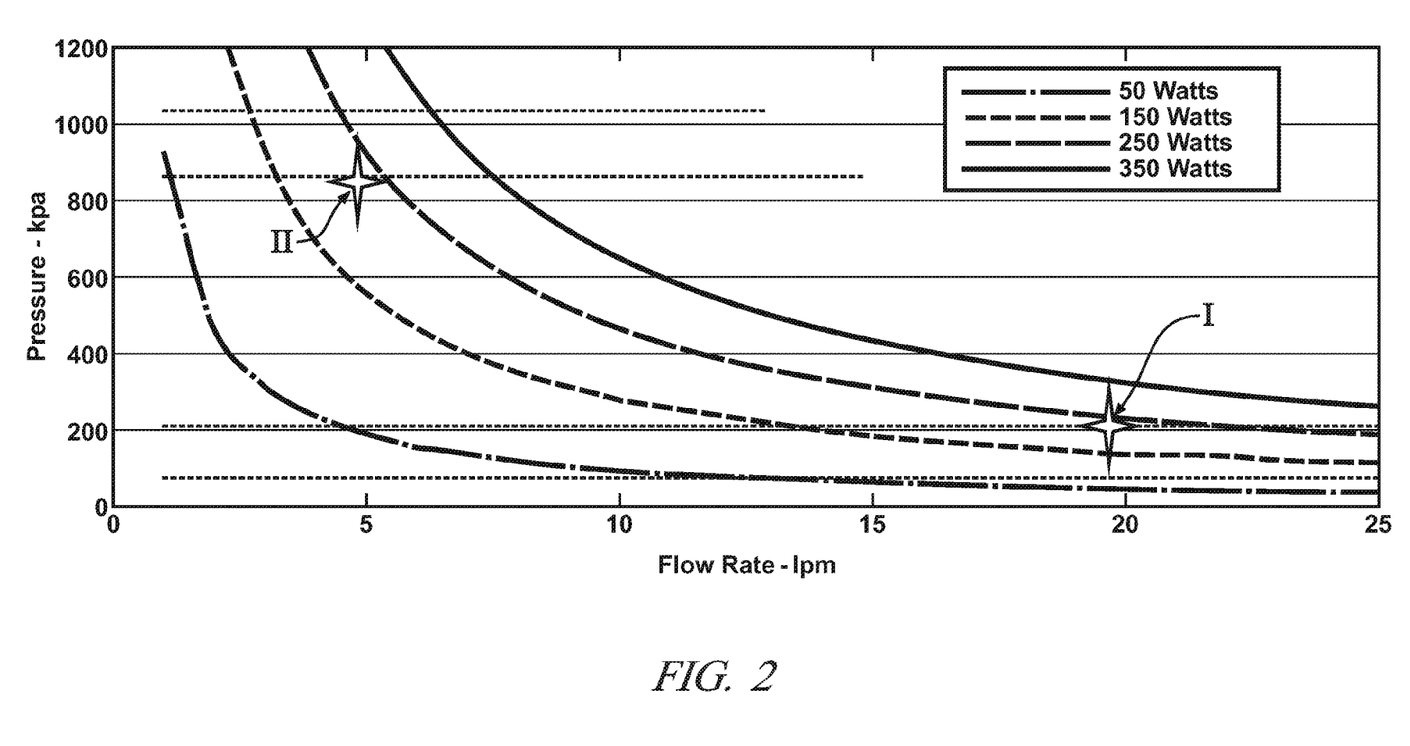
FIG. 2 graphically illustrates exemplary flow characteristics for an exemplary hydraulic pump element in accordance with the present disclosure.

FIG. 2 graphically illustrates an exemplary characteristic flow curve for embodiments of the first and second positive displacement hydraulic pump elements 62 and 64. A first preferred operating point I represents a low pressure, high flow operating point. A second preferred operating point II represents a high pressure, low flow operating point. In one embodiment, the first preferred operating point I represents a preferred hydraulic line pressure and flow rate that is determined for the first hydraulic circuit segment 10A, and the second preferred operating point II represents a hydraulic line pressure and flow rate that is determined for the second hydraulic circuit segment 10B. The first and second preferred operating points I and II may be experimentally determined during system calibration and development and can vary among particular hardware applications. For example, in the exemplary hydraulic control system 10 the first preferred operating point I delivers approximately 20 liters per minute (lpm) hydraulic flow at 210 kPa using 220 Watts of power and the second preferred operating point II delivers approximately 5 liters per minute (lpm) hydraulic flow at 850 kPa using 230 Watts of power. Thus, the first and second positive displacement hydraulic pump elements 62 and 64 can use a commonly designed pump element having a common characteristic flow curve to deliver hydraulic fluid flow at preferred pressures to achieve the needs of the first and second hydraulic circuit segments 10A and 10B which achieves a characteristic flow point at a relatively low power consumption. By way of comparison, a hydraulic control system using a single pump element must be able to deliver a flowrate of 25 lpm at 850 kPa to meet flow and pressure requirements of the first and second hydraulic circuit segments 10A and 10B in one embodiment, with an associated power requirement of 1150 Watts. In contrast, the exemplary hydraulic control system 10 can be configured to use the first positive displacement hydraulic pump element 62 operating at the first preferred operating point I to deliver approximately 20 liters per minute (lpm) hydraulic flow at 210 kPa using 220 Watts of power and use the second positive displacement hydraulic pump element 64 operating at the second preferred operating point II to deliver approximately 5 liters per minute (lpm) hydraulic flow at 850 kPa using 230 Watts of power, for a total power consumption of 450 Watts. Thus, the hydraulic control system 10 yields a power saving of 1150 Watts-450 Watts=700 Watts. Furthermore, excess pressure and/or flow can minimized, thus minimizing wasted power consumption and increased hydraulic friction associated with the excess hydraulic pressure and/or flow.

The first and second positive displacement hydraulic pump elements 62 and 64 can be configured to rotate at different rotational speeds in response to rotation of the single input shaft 23 using known gearing sequences which include speed reduction or speed multiplication. The first fluidic pumping element is controllable to a first pump operating point to achieve a preferred high fluidic flow rate in the first hydraulic circuit segment. The second fluidic pumping element is controllable to a second pump operating point to achieve a preferred high fluidic pressure at a low fluidic flow rate in the second hydraulic circuit segment.

Hydraulic fluid pressure and flow demands in the second hydraulic circuit segment 10B are substantially affected by transient event considerations, e.g., clutch activation associated with transmission shifting. Hydraulic fluid pressure and flow demands in the first hydraulic circuit segment 10A are affected by considerations related to cooling and lubrication. Therefore, the first preferred operating point represents a high pressure, low flow rate stream of hydraulic fluid, and the second preferred operating point represents a low pressure, high flow rate stream of hydraulic fluid.

In hybrid applications including multiple torque generative devices, multiple control schemes may be developed to control hydraulic pump operation. One control scheme includes permitting hydraulic flow between the first and second hydraulic circuit segments 10A and 10B during an engine on operating state when traveling at low vehicle speeds.

Figure 3:
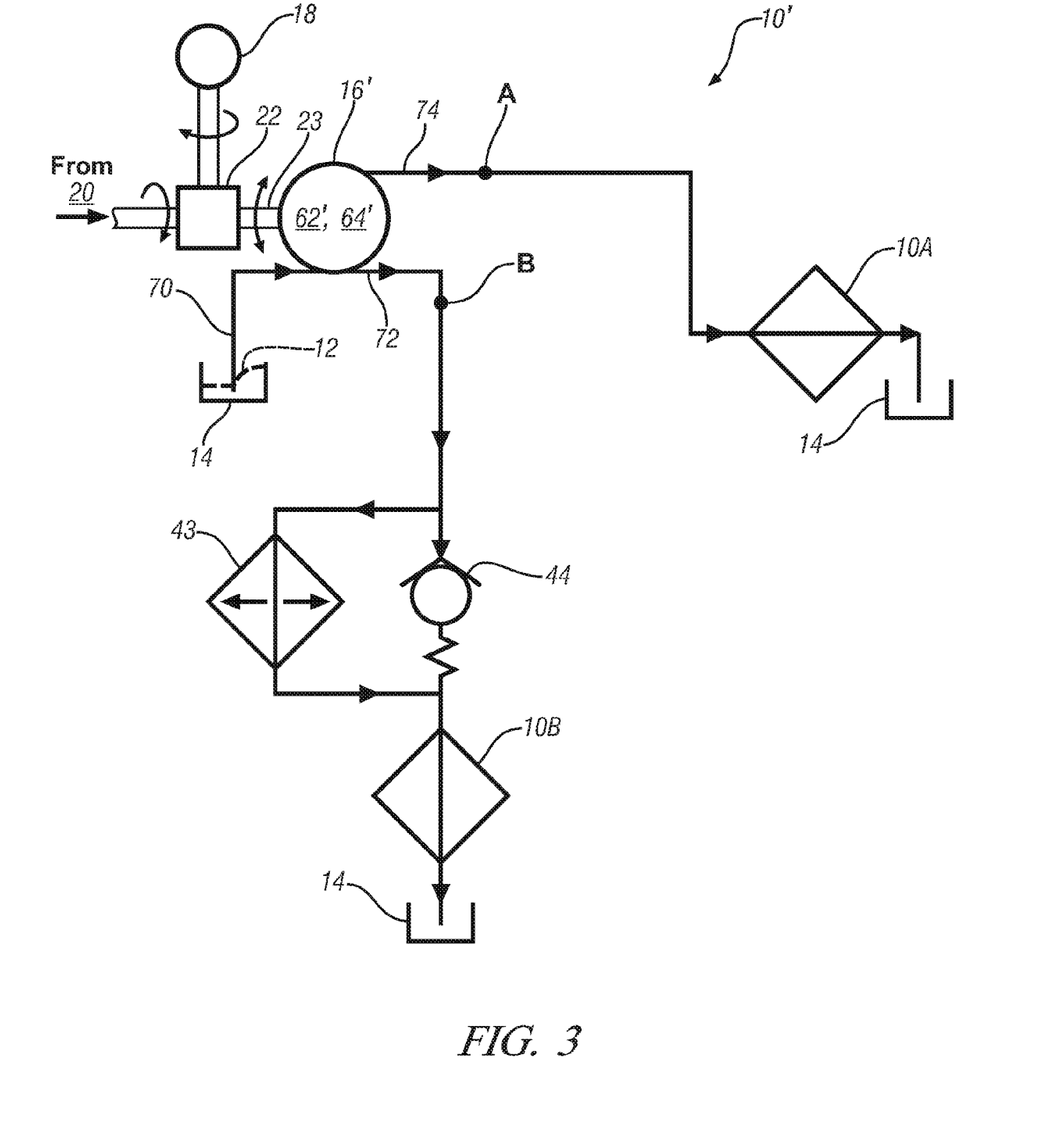
FIG. 3 schematically illustrates a hydraulic control system including a dual element hydraulic pump element fluidly coupled to provide pressurized hydraulic fluid to a hydraulic circuit for a device including a first hydraulic circuit segment and a second hydraulic circuit segment in accordance with the present disclosure.

FIG. 3 depicts an embodiment of the hydraulic control system 10' including the hydraulic pump 16' configured as a unitary dual element pump device including first and second positive displacement hydraulic pump elements 62' and 64' housed in a common housing and driven using a single input shaft 23. The hydraulic pump 16' is preferably one of a fixed displacement binary gear pump and a fixed displacement binary balanced vane pump. The hydraulic pump 16' can include a single inlet port or a dual inlet port, and includes first and second outlet ports 74 and 72 located approximately 180 degrees from each other to balance the effect of fluid force on the pump 16'. The first and second outlet ports 74 and 72 are associated with the first and second positive displacement hydraulic pump elements 62' and 64', respectively. The first positive displacement hydraulic pump element 62' is configured to pump hydraulic fluid at a low pressure, high volumetric flowrate through the first outlet port 74 to the first hydraulic circuit segment 10A. The second positive displacement hydraulic pump element 64' is configured to pump hydraulic fluid at a high pressure, low volumetric flowrate through the second outlet port 72 to the second hydraulic circuit segment 10B, which preferably includes a pressure accumulator device 43 and a pressure valve 44. The hydraulic pump 16' is preferably driven via the single input shaft 23 by a dual power source including the internal combustion engine 20 and the electric motor 18, which are selectively coupled to the hydraulic pump 16' using the controllable one-way clutch 22. The controllable one-way clutch 22 is configured to control torque transfer from a selected one of the internal combustion engine 20 and the electric motor 18. In a first clutch actuation mode, the controllable one-way clutch 22 is controlled to power the hydraulic pump 16' using torque power from the engine 20. In a second clutch actuation mode, the controllable one-way clutch 22 is controlled to power the hydraulic pump 16' using torque power from the electric motor 18. Alternatively, the hydraulic pump 16' is driven via the single input shaft 23 by a single power source, e.g., the electric motor 18.

The accumulator 43 is configured to accumulate and store pressurized hydraulic fluid for maintaining hydraulic pressure in the second hydraulic circuit segment 10B to supplement and augment fluidic line pressure. One having ordinary skill in the art will recognize that multiple accumulator embodiments may be used consistent with the disclosure.

In one embodiment the hydraulic pump 16' having dual element pumping capability includes the inlet port 70 configured for communicating hydraulic fluid 12 from the sump 14. The hydraulic pump 16' including the first positive displacement hydraulic pump element 62', which is a large positive displacement pump section configured to pump hydraulic fluid at a low pressure, high volumetric flowrate to the first hydraulic circuit segment 10A. The hydraulic pump 16' including the first positive displacement hydraulic pump element 64', which is a small positive displacement pump section configured to pump hydraulic fluid at a high pressure, low volumetric flowrate to the second hydraulic circuit segment 10B.

Figure 4:
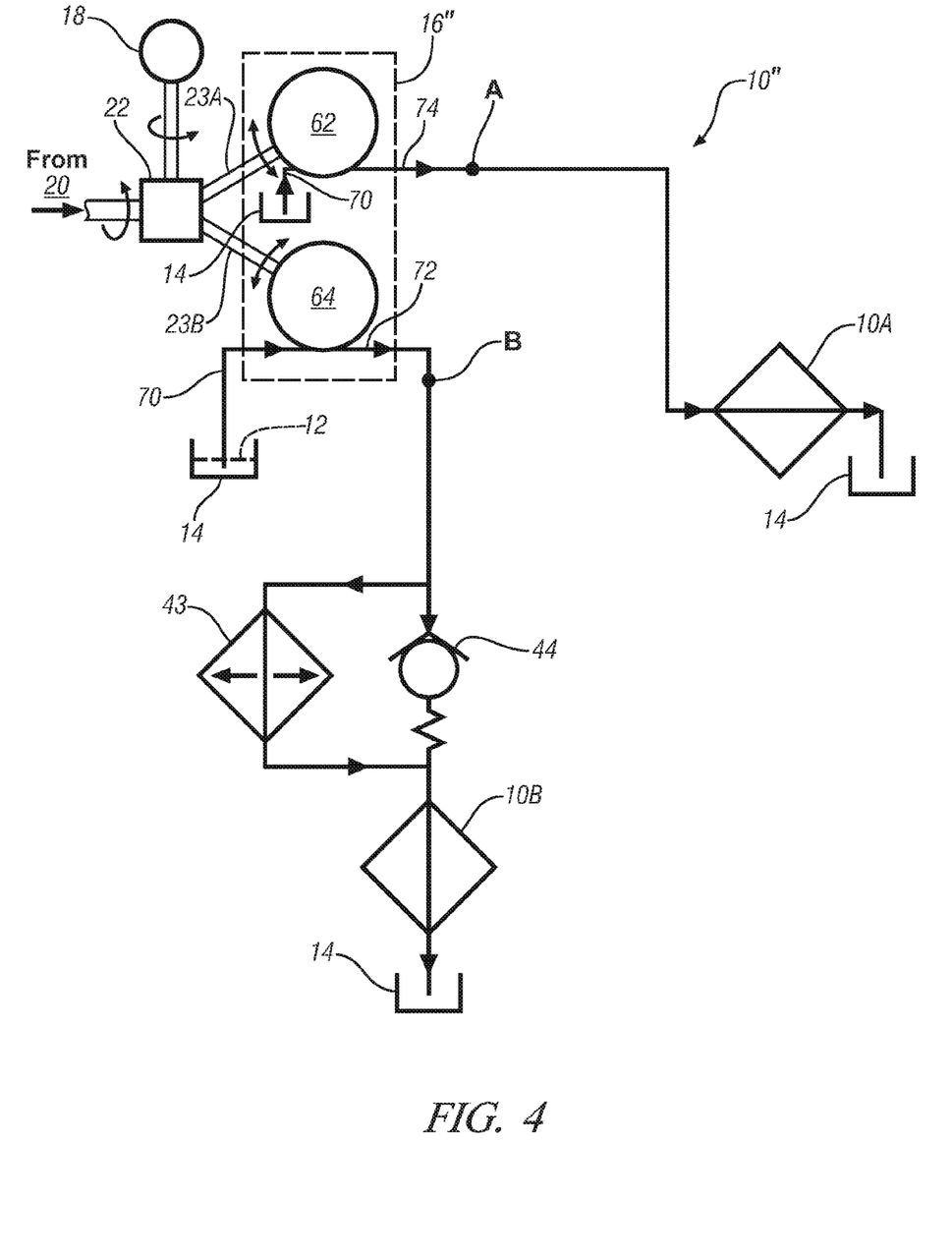
FIG. 4 schematically illustrates a hydraulic control system including a hydraulic pump element fluidly coupled to provide pressurized hydraulic fluid to a hydraulic circuit for a device including a first hydraulic circuit segment and a second hydraulic circuit segment in accordance with the present disclosure.

FIG. 4 depicts an embodiment of the hydraulic control system 10" including the hydraulic pump 16" configured as a unitary dual element pump device including first and second positive displacement hydraulic pump elements 62 and 64 housed in a common housing and driven using dual input shafts 23A and 23B, respectively. The first and second positive displacement hydraulic pump elements 62 and 64 are each preferably a fixed displacement element, including e.g., one of a fixed displacement binary gear pump and a fixed displacement binary balanced vane pump. Hydraulic fluid is supplied via inlet port 70, which can include a single inlet port or a dual inlet port. The first and second positive displacement hydraulic pump elements 62 and 64 include respective first and second outlet ports 74 and 72. The first positive displacement hydraulic pump element 62 is configured to pump hydraulic fluid at a low pressure, high volumetric flowrate through the first outlet port 74 to the first hydraulic circuit segment 10A. The second positive displacement hydraulic pump element 64 is configured to pump hydraulic fluid at a high pressure, low volumetric flowrate through the second outlet port 72 to the second hydraulic circuit segment 10B, which preferably includes the pressure accumulator device 43 and a pressure valve 44. The first and second positive displacement hydraulic pump elements 62 and 64 are driven via the individual input shafts 23A and 23B originating from a dual power source including the internal combustion engine 20 and the electric motor 18, which are selectively coupled to the hydraulic pump 16" using the controllable one-way clutch 22. The controllable one-way clutch 22 is configured to control torque transfer from a selected one of the internal combustion engine 20 and the electric motor 18. In a first clutch actuation mode, the controllable one-way clutch 22 is controlled to power the hydraulic pump 16" using torque power from the engine 20. In a second clutch actuation mode, the controllable one-way clutch 22 is controlled to power the hydraulic pump 16" using torque power from the electric motor 18.

In one embodiment the hydraulic pump 16' having dual element pumping capability includes the inlet port 70 configured for communicating hydraulic fluid 12 from the sump 14. The hydraulic pump 16' including the first positive displacement hydraulic pump element 62', which is a large positive displacement pump section configured to pump hydraulic fluid at a low pressure, high volumetric flowrate to the first hydraulic circuit segment 10A. The hydraulic pump 16' including the first positive displacement hydraulic pump element 64', which is a small positive displacement pump section configured to pump hydraulic fluid at a high pressure, low volumetric flowrate to the second hydraulic circuit segment 10B.

During powertrain operation when the engine 10 drives the dual element pump 16, the speed of the engine 10 controls pump speed and torque of the dual element pump 16. When the electric motor 18 drives the dual element pump 16, the electric motor 18 controls pump speed and torque of the dual element pump 16, thereby allowing for direct control of the line pressure (i.e. pressure of the hydraulic fluid 12 within the main line 30) and the lube pressure (i.e. pressure of the hydraulic fluid 12 within the lubrication supply line 36).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:
1. Hydraulic fluid circuit for a torque transmission device, comprising:
  a first hydraulic circuit segment fluidly decoupled from a second hydraulic circuit segment;
  a hydraulic pump comprising a first fluidic pumping element and a second fluidic pumping element, the first and second fluidic pumping elements comprising positive-displacement pumping elements having a common characteristic flow curve;

the first fluidic pumping element configured to fluidly communicate with the first hydraulic circuit segment;

the second fluidic pumping element configured to fluidly communicate with the second hydraulic circuit segment;

a first power source and a second power source selectively rotatably coupled to the first and second fluidic pumping elements; and the first fluidic pumping element controllable to a first pump operating point of the common characteristic flow curve to fluidly communicate a hydraulic flow stream at a volumetric flowrate sufficient to achieve cooling and lubricating functions in the first hydraulic circuit segment coincident with the second fluidic pumping element controllable to a second pump operating point of the common characteristic flow curve to fluidly communicate a hydraulic flow stream at a hydraulic pressure sufficient to achieve activation of clutches in the second hydraulic circuit segment.

2. The hydraulic fluid circuit of claim 1, wherein the first power source comprises an electrically driven pump motor controlled to a preferred operating speed to operate the first fluidic pumping element at the first pump operating point and coincidentally to operate the second fluidic pumping element at the second pump operating point.

3. The hydraulic fluid circuit of claim 2, wherein the second power source comprises a mechanically driven power source.

4. The hydraulic fluid circuit of claim 3, further comprising a controllable one-way clutch configured to transfer torque from one of the electrically driven pump motor and the mechanically driven power source to both the first and second fluidic pumping elements.

5. The hydraulic fluid circuit of claim 2, wherein the hydraulic pump comprises a unitary dual element hydraulic pump comprising a single inlet port and first and second outlet ports fluidly coupled to the first hydraulic circuit segment and the second hydraulic circuit segment, respectively, said first and second fluidic pumping elements each comprising a positive displacement hydraulic pump element.

6. The hydraulic fluid circuit of claim 1, wherein the first hydraulic circuit segment further comprises a mechanism for monitoring volumetric flow.

7. The hydraulic fluid circuit of claim 6, wherein the mechanism for monitoring volumetric flow comprises a temperature sensor configured to monitor a temperature of an electric motor of the torque transmission device.

8. The hydraulic fluid circuit of claim 1, wherein the second hydraulic circuit segment further comprises a pressure sensor configured to monitor hydraulic pressure therein.

9. The hydraulic fluid circuit of claim 1, wherein the first hydraulic circuit segment fluidly decoupled from the second hydraulic circuit segment further comprises the first hydraulic circuit segment comprising the high flowrate circuit including a mechanism for monitoring volumetric flow therethrough and the second hydraulic circuit segment comprising the high pressure circuit including a pressure sensor configured to monitor hydraulic pressure therein.

10. Hydraulic fluid circuit for a power transmission device of a hybrid powertrain system, comprising:
a first hydraulic circuit segment fluidly decoupled from a second hydraulic circuit segment;
a hydraulic pump comprising a first positive displacement fluidic pumping element and a second positive displacement fluidic pumping element configured to fluidly communicate respectively with the first hydraulic circuit segment and the second hydraulic circuit segment, the first and second positive displacement fluidic pumping elements employing commonly designed pump elements having common characteristic flow curves;
the first positive displacement fluidic pumping element controllable to a first pump operating point to achieve a preferred fluidic flow rate sufficient to achieve cooling and lubricating functions in the first hydraulic circuit segment;
the second positive displacement fluidic pumping element controllable to a second pump operating point to achieve a preferred fluidic pressure sufficient to achieve activation of clutches at a low fluidic flow rate in the second hydraulic circuit segment;
the first and second fluidic positive displacement pumping elements selectively rotatably coupled to one of an electric motor and a mechanical drive mechanism; and
the electric motor controllable to a preferred operating speed to operate the first positive displacement fluidic pumping element at the first pump operating point to achieve the preferred high fluidic flow rate at a low fluidic pressure at a volumetric flowrate sufficient to achieve cooling and lubricating functions and coincidentally to operate the second positive displacement fluidic pumping element at the second pump operating point.

11. The hydraulic fluid circuit of claim 10, wherein the hydraulic pump comprises a unitary dual element hydraulic pump comprising a single inlet port and first and second outlet ports fluidly coupled to the first hydraulic circuit segment and the second hydraulic circuit segment, respectively.

12. The hydraulic fluid circuit of claim 7, further comprising a controllable one-way clutch selectively rotatably coupling one of the electric motor and the mechanical drive mechanism to the first and second fluidic positive displacement pumping elements to coincidentally transfer torque to both the first and second positive displacement fluidic pumping elements.

13. Hydraulic fluid circuit for a torque transmission device, comprising:
a first hydraulic circuit segment fluidly decoupled from a second hydraulic circuit segment;
a hydraulic pump comprising a first fluidic pumping element and a second fluidic pumping element, the first and second fluidic pumping elements employing commonly designed pump elements having common characteristic flow curves;
the first fluidic pumping element configured to fluidly communicate with the first hydraulic circuit segment;
the second fluidic pumping element configured to fluidly communicate with the second hydraulic circuit segment;
the first and second fluidic pumping elements selectively rotatably coupled to one of an electric motor and a mechanical drive mechanism;
the first fluidic pumping element controllable to a first pump operating point comprising a volumetric flowrate sufficient to achieve cooling and lubricating functions in the first hydraulic circuit segment coincident with the second fluidic pumping element controllable to a second pump operating point comprising a hydraulic pressure sufficient to achieve activation of clutches in the second hydraulic circuit segment.

14. The hydraulic fluid circuit of claim 13, wherein the electric motor is controlled to a preferred operating speed to operate the first fluidic pumping element at the first pump operating point and coincidentally to operate the second fluidic pumping element at the second pump operating point.

* * * * *